(12) United States Patent
Welton et al.

(10) Patent No.: US 8,657,003 B2
(45) Date of Patent: Feb. 25, 2014

(54) METHODS OF PROVIDING FLUID LOSS CONTROL OR DIVERSION

(75) Inventors: Thomas D. Welton, Duncan, OK (US); Bradley L. Todd, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 669 days.

(21) Appl. No.: 12/957,522

(22) Filed: Dec. 1, 2010

(65) Prior Publication Data
US 2012/0138303 A1  Jun. 7, 2012

(51) Int. Cl.
*E21B 33/13* (2006.01)

(52) U.S. Cl.
USPC ............... 166/284; 166/305.1; 166/280.1; 166/380.1; 166/281; 166/279

(58) Field of Classification Search
USPC ......... 166/305.1, 280.1, 380.1, 284, 279, 281
See application file for complete search history.

(56) References Cited

U.S. PATENT DOCUMENTS

| | | | |
|---|---|---|---|
| 5,565,513 A | 10/1996 | Kinsey, III | |
| 6,896,058 B2 | 5/2005 | Munoz | |
| 7,044,220 B2 | 5/2006 | Nguyen | |
| 7,178,596 B2 | 2/2007 | Blauch | |
| 2004/0074643 A1* | 4/2004 | Munoz et al. | 166/279 |
| 2004/0261993 A1* | 12/2004 | Nguyen | 166/276 |
| 2004/0261995 A1* | 12/2004 | Nguyen et al. | 166/279 |
| 2004/0261996 A1 | 12/2004 | Munoz | |
| 2006/0118301 A1* | 6/2006 | East et al. | 166/280.2 |
| 2006/0157243 A1* | 7/2006 | Nguyen | 166/280.2 |
| 2006/0169182 A1 | 8/2006 | Todd | |
| 2006/0172893 A1 | 8/2006 | Todd | |
| 2008/0070807 A1 | 3/2008 | Munoz et al. | |
| 2009/0062157 A1 | 3/2009 | Munoz | |
| 2009/0242202 A1* | 10/2009 | Rispler et al. | 166/281 |
| 2011/0005761 A1* | 1/2011 | Luo et al. | 166/308.2 |

FOREIGN PATENT DOCUMENTS

| | | |
|---|---|---|
| EP | 1 413 710 A1 | 4/2004 |
| WO | WO 2009027685 A1 | 3/2009 |

OTHER PUBLICATIONS

International Search Report and Written Opinion for PCT/GB2011/001673 dated Feb. 29, 2012.

* cited by examiner

*Primary Examiner* — Shane Bomar
*Assistant Examiner* — Silvana Runyan
(74) *Attorney, Agent, or Firm* — Craig W. Roddy; McDermott Will & Emery LLP

(57) ABSTRACT

Methods of controlling fluid loss, providing fluid diversion, or plugging a portion of a well bore using a treatment fluid including relatively insoluble borate material particulates that are placed into a subterranean formation to provide the desired action and then degrade over time in the subterranean formation in the presence of an aqueous fluid such as water.

16 Claims, No Drawings

METHODS OF PROVIDING FLUID LOSS CONTROL OR DIVERSION

BACKGROUND OF THE INVENTION

The present invention relates to fluid additives useful for fluid loss control, diversion, and plugging operations for use in subterranean formations. More particularly, the present invention relates to methods of using relatively insoluble borate material particulates in fluid loss control, diversion, and plugging operations.

Degradable materials are commonly employed in subterranean operations. For instance, water-hydrolysable materials such a polylactic acid, may be used in subterranean operations as fluid loss control particles, diverting agents, filter cake components, drilling fluid additives, cement additives, and the like. In some cases, the water-hydrolysable material may be capable of releasing a desirable degradation product, e.g., an acid, during its hydrolysis. The acid released by certain water-hydrolysable materials may be used to facilitate a reduction in viscosity of a fluid or to degrade a filter cake, as well as for numerous other functions in subterranean operations.

Subterranean treatment fluids are commonly used in stimulation, sand control, and completion operations. As used herein, the term "treatment," or "treating," refers to any subterranean operation that uses a fluid in conjunction with a desired function and/or for a desired purpose. The term "treatment," or "treating," does not imply any particular action by the fluid.

An example of a subterranean treatment that often uses an aqueous treatment fluid is hydraulic fracturing. In a hydraulic fracturing treatment, a viscous fracturing fluid is introduced into the formation at a high enough rate to exert a sufficient pressure on the formation to create and/or extend fractures therein. The viscous fracturing fluid suspends proppant particles that are to be placed in the fractures to prevent the fractures from fully closing (once the hydraulic pressure is released), thereby forming conductive channels within the formation through which hydrocarbons can flow toward the well bore for production. In certain circumstances, a portion of the fracturing fluid may be lost during the fracturing operation, e.g., through undesirable leak-off into natural fractures present in the formation. Typically, operators have attempted to solve this problem by including a fluid loss control additive in the fracturing fluid. Many conventional fluid loss control additives permanently reduce the permeability of a subterranean formation, negatively affect the rheology of the treatment fluid in which they are used, and/or reduce the rate at which the fluid is allowed to penetrate or leak off into desirable locations within the subterranean formation. Moreover, while it may be desirable to control or prevent fluid loss for a given period of time, in some instances it may become desirable to later allow a treatment fluid to penetrate or leak off into that portion of the subterranean formation. Thus, costly and time-consuming operations may be required to reverse the effects of conventional fluid loss control additives on the treatment fluid and/or to restore permeability to those portions of the subterranean formation affected by the fluid loss control additives.

In addition to helping control the loss of fluid into the formation, additives may also be added to treatment fluids in order to divert the treatment toward desired areas within the formation. For example, it may be desirable to add a diverting agent toward the end of an operation treating a section of a subterranean formation such that the agent will then slow or stop the flow of further treatment fluid into that area, thus diverting later-placed fluid to other areas.

Numerous additives are used in the art to help control fluid loss or to divert treatment fluids in subterranean operations. However, the use of these conventional additives may give rise to other problems. In some instances, the fluid loss control additives and diverting additives used are toxic and thus may harm the environment; this problem may be aggravated because many are poorly degradable or nondegradable within the environment. Due to environmental regulations, costly procedures often must be followed to dispose of the treatment fluids containing such compounds, ensuring that they do not contact the marine environment and groundwater. In addition, some known materials require hydrocarbon treatments to remove them from the formation after they are placed or require a high temperature for removal, or a large volume of under-saturated liquid (such as for the removal of salts) to be removed.

Thus, it is desirable to have a fluid loss control or diverting agent that poses little or no risk to the environment and that is able to degrade over time and restore lost permeability.

SUMMARY OF THE INVENTION

The present invention relates to fluid additives useful for fluid loss control, diversion, and plugging operations for use in subterranean formations. More particularly, the present invention relates to methods of using relatively insoluble borate material particulates in fluid loss control, diversion, and plugging operations.

One embodiment of the present invention provides methods of controlling fluid loss during a fracturing operation comprising: providing a fracturing fluid comprising a base fluid and relatively insoluble borate material particulates; introducing the fracturing fluid into a portion of a subterranean formation at a pressure sufficient to create or extend at least one fracture; allowing the relatively insoluble borate material particulates to provide fluid loss control in the portion of the subterranean formation; and, allowing the relatively insoluble borate material particulates to degrade over time in the subterranean formation and thereby reestablish permeability of the portion of the subterranean formation.

Another embodiment of the present invention provides methods of providing fluid diversion in a subterranean operation comprising: providing a treatment fluid comprising a base fluid and relatively insoluble borate material particulates; introducing the treatment fluid into a portion of a subterranean formation at matrix rates wherein the subterranean formation comprises a first zone and a second zone and wherein the first zone is more permeable to the treatment fluid than the second zone; and, allowing the relatively insoluble borate material particulates to seal the rock surfaces along the first zone and thereby divert the treatment fluid to the second zone.

Another embodiment of the present invention provides methods of plugging a portion of a well bore annulus comprising: providing a treatment fluid comprising a base fluid and relatively insoluble borate material particulates; introducing the treatment fluid into a portion of an annulus along the well bore such that the relatively insoluble borate material particulates substantially fill the annulus along the zone to be plugged.

Other features and advantages of the present invention will be readily apparent to those skilled in the art upon a reading of the description of preferred embodiments that follows.

DESCRIPTION OF PREFERRED EMBODIMENTS

The present invention relates to fluid additives useful for fluid loss control, diversion, and plugging operations for use in subterranean formations. More particularly, the present invention relates to methods of using relatively insoluble borate material particulates in fluid loss control, diversion, and plugging operations.

The present invention provides improved methods of providing temporary fluid loss control and diversion of treatment fluids in subterranean producing zones penetrated by well bores. The methods include placing a treatment fluid comprising a relatively insoluble borate material ("RIBM") such that the RIBM creates a physical barrier to fluid flow (such as by blocking pore throats in a formation or by filling an annulus area) and then allowing the RIBM to degrade over time to remove the physical barrier. The RIBM degrades or dissolves in the presence of an aqueous fluid in contact therewith and, once removed, the free movement of fluids within the formation is again allowed.

The RIBM's suitable for use in the present invention include, but are not limited to, solid, slowly soluble borate materials such as anhydrous sodium tetraborate (also known as anhydrous borax), sodium tetraborate monohydrate, and anhydrous boric acid (also known as boric oxide). Without being limited by theory, it is believed that these borate materials are only slightly soluble in water; however, with time and heat in the subterranean zone, the borate materials react with the surrounding aqueous fluid and are hydrated. The resulting hydrated borate materials are highly soluble in water as compared to the anhydrous borate materials and as a result can be dissolved in an aqueous fluid. The total time required for the anhydrous borate materials to degrade and dissolve in an aqueous fluid is in the range of from about eight hours to about seventy-two hours depending upon the temperature of the subterranean zone in which they are placed. One skilled in the art would recognize that some hydrates, such as sodium tetraborate monohydrate, are relatively insoluble compared to their counterparts that are hydrated to a greater degree.

The RIBM used is placed into a subterranean zone by introducing a treatment fluid containing the RIBM into the subterranean zone. The treatment fluid dissipates into the subterranean zone through openings, which may be naturally occurring (cracks, fractures, and fissures) or man-made annulus between nested pipes or between a well bore and a pipe (well bores, perforations, and fractures). As the treatment fluid is placed, the RIBM is screened out of the treatment fluid by the formation whereby it is packed into the openings based on the selected size of particulate. The RIBM can be used as fluid loss control agents, diverting agents, or plugging agents.

Providing effective fluid loss control for subterranean treatment fluids is highly desirable. "Fluid loss," as that term is used herein, refers to the undesirable migration or loss of fluids (such as the fluid portion of a drilling mud or cement slurry) into a subterranean formation and/or a proppant pack. Treatment fluids may be used in any number of subterranean operations, including drilling operations, fracturing operations, acidizing operations, gravel-packing operations, acidizing operations, well bore clean-out operations, and the like. Fluid loss may be problematic in any number of these operations. In fracturing treatments, for example, fluid loss into the formation may result in a reduction in fluid efficiency, such that the fracturing fluid cannot propagate the fracture as desired. Fluid loss control materials are additives that lower the volume of a filtrate that passes through a filter medium. That is, they block the pore throats and spaces that otherwise allow a treatment fluid to leak out of a desired zone and into an undesired zone. Particulate materials may be used as fluid loss control materials in subterranean treatment fluids to fill/bridge the pore spaces in a formation matrix and/or proppant pack and/or to contact the surface of a formation face and/or proppant pack, thereby forming a type of filter cake that blocks the pore spaces in the formation or proppant pack, and prevents fluid loss therein. In some embodiments, when a RIBM is used as a fluid loss control agent, it may be used in conjunction with a fracturing method. In some preferred embodiments the RIBM is used as a fluid loss control agent during the fracturing operation, that is, the fluid loss control agent is placed into a treatment fluid that is then placed into the portion of the subterranean formation at a pressure/rate sufficient to create or extend at least one fracture in that portion of the subterranean formation.

Diverting agents have similar actions but strive for a somewhat different approach. Diverting agents are used to seal off a portion of the subterranean formation. By way of example, in order to divert a treatment fluid from highly permeable portions of the formation into the less permeable portions of the formation, a volume of treatment fluid may be pumped into the formation followed by a diverting material to seal off a portion of the formation where the first treatment fluid penetrated. After the diverting material is placed, a second treatment fluid may be placed wherein the second treatment will be diverted to a new zone for treatment by the previously placed diverting agent. When being placed, the treatment fluid containing the diverting agent will flow most readily into the portion of the formation having the largest pores, fissures, or vugs, until that portion is bridged and sealed, thus diverting the remaining fluid to the next most permeable portion of the formation. These steps may be repeated until the desired number of stages of treating fluid has been pumped. Generally, the methods of diverting using insoluble borate compounds of the present invention are preformed at matrix flow rates; that is, flow rates and pressures that are below the rate/pressure sufficient to create or extend fractures in that portion of a subterranean formation.

Plugging agents are similar to diverting agents. Whereas diverting agents are used to seal off a portion of the subterranean formation, plugging agents are used to seal off a well bore, providing zonal isolation. When a particulate plugging agent is used, the effect is similar to that of a diverting agent, that is a fluid is placed having the plugging agent therein and the plugging agent seals the well bore face such that fluid cannot enter the permeable zones until the plugging agent is removed. In some embodiments it may be desirable to use the RIBM to completely fill a portion of an annulus along a well bore. In such embodiments, large quantities of the diverting agent will likely be required in order to completed close a flow path rather than simply block pore throats or rock faces.

Whether using the RIBM as a fluid loss control agent, a diverting agent, or a plugging agent, a variety of treatment fluids can be used for packing the openings including, but not limited to, fresh water, salt water, brine (saturated salt water), seawater, produced water (subterranean formation water brought to the surface), surface water (such as lake or river water), and flow back water (water placed into a subterranean formation and then brought back to the surface). In some embodiments mine drainage water may also be used. Mine drainage water as used herein includes: acid mine drainage water, alkaline mine drainage water, and metal mine drainage water. Acid mine drainage water is water contaminated when pyrite, an iron sulfide, is exposed and reacts with air and water to form sulfuric acid and dissolved iron. Acid mine drainage water is often associated with the outflow of acidic water from metal mines or coal mines but it may also come from other sources such as where the earth has been disturbed, liquid that drains from coal stocks, coal handling facilities, and the like. Alkaline mine drainage water is alkaline water contaminated often with high levels of metals; often the rock that produces alkaline drainage water has calcite and/or dolomite present. Metal mine drainage water is water contaminated with metals and is often from mines that produce or have produced lead, gold, and other metals.

Of these, salt water, brine, and seawater are generally preferred. The methods of the present invention may be used in many different types of subterranean treatment operations wherein fluid loss control is desired. Such operations include, but are not limited to, acidizing operations, scale inhibiting operations, water blocking operations, clay stabilizer operations, biocide operations, fracturing operations, frac-packing operations, and gravel packing operations.

When the treatment fluid is an aqueous acid solution, the aqueous acid solution can include one or more acids such as hydrochloric acid, hydrofluoric acid, acetic acid, formic acid and other organic acids. For example, in acidizing procedures for increasing the porosity of subterranean producing zones, a mixture of hydrochloric and hydrofluoric acids is commonly used in sandstone formations.

When the treatment fluid is a scale inhibitor treatment it may contain one or more scale inhibitor materials including, but not limited to, phosphonic acid based scale inhibitors such as diethylene triamine penta(methylene phosphonic acid) and bis(hexamethylene)triamine penta(methylene phosphonic acid), and polymeric scale inhibitors such as phosphinocarboxylic acid copolymers, polyaspartic acid, and polyacrylate. These scale inhibitor materials attach themselves to the subterranean zone surfaces whereby they inhibit the formation of scale in tubular goods and the like when hydrocarbons and water are produced from the subterranean zone.

When the treatment fluid is a water blocking treatment it may contain one or more water blocking materials that attach themselves to the formation in water producing areas whereby the production of water is reduced or terminated. Examples of water blocking materials that can be used include, but are not limited to, sodium silicate gels, organic polymers with metal cross-linkers and organic polymers with organic cross-linkers. Of these, cross-linked organic polymers may be preferred.

When the treatment fluid is a clay stabilizer treatment it may contain one or more clay stabilizer materials used to prevent the migration or swelling of clays within the formation. Examples of clay stabilizer materials that can be used include, but are not limited to, ammonium salts, polyamines, and polyquaternary amines (such as polydimethyldiallyl ammonium chloride).

When the treatment fluid is a biocide operation it may contain one or more biocide materials used to reduce or eliminate biological contamination within the subterranean formation. Suitable examples of biocides may include both oxidizing biocides and nonoxidizing biocides. Examples of oxidizing biocides include, but are not limited to, sodium hypochlorite, hypochlorous acid, chlorine, bromine, chlorine dioxide, and hydrogen peroxide. Examples of nonoxidizing biocides include, but are not limited to, aldehydes, quaternary amines, isothiazolines, carbamates, phosphonium quaternary compounds, and halogenated compounds. Factors that determine what biocide will be used in a particular application may include, but are not limited to, cost, performance, compatibility with other components of the treatment fluid, kill time, and environmental compatibility. One skilled in the art with the benefit of this disclosure will be able to choose a suitable biocide for a particular application.

When the treatment fluid is a fracturing operation, a frac-packing operation, or gravel packing operation, or some other operation used to either place particulates or stimulate the formation, the treatment fluid will generally be made more viscous through the use of viscosifiers and perhaps crosslinkers.

As mentioned, the RIBM degrades over time when in contact with an aqueous fluid and converts to the hydrated form of borate material. The treatment fluid itself may be aqueous, or the RIBM may come into contact with water after it is placed into the subterranean formation. The RIBM dissolves in an aqueous fluid, thereby eliminating the need for contacting the subterranean zone with clean-up fluids to remove the material and restore permeability. Another advantage of the relatively insoluble borate material particulates used in the present invention is that the melting points of the materials are high, i.e., 1367° F. for anhydrous sodium tetraborate and 840° F. for anhydrous boric oxide, and as a result, the materials do not readily soften and are suitable for use in high temperature subterranean zones.

The selection of the proper size for the RIBM is related in large part to the size of the rock, annulus, or formation pores. Suitable sizes can range from a micron to as large as 8 U.S. Mesh. In some preferred embodiments, the particulates are sized from about 1 to about 150 microns.

Selection of an RIBM and treatment fluid for a desired use depends on a number of factors including (1) the solubility of the chosen RIBM, (2) the particle size of the RIBM, (3) the pH of the treatment fluid, (4) the design temperature, and (5) the loading of RIBM in the treatment fluid. As used herein the term "design temperature" refers to an estimate or measurement of the actual temperature at the down hole environment at the time of the treatment. That is, design temperature takes into account not only the bottom hole static temperature ("BHST"), but also the effect of the temperature of the treatment fluid on the BHST during treatment. Because treatment fluids may be considerably cooler than BHST, the difference between the two temperatures can be quite large.

The solubility of the RIBM can be affected by the pH of the treatment fluid, by the design temperature, and by the selection of the RIBM itself. By way of example, for pH levels of between about 8 and 12, higher pH increases solubility of an anhydrous boric acid RIBM to whereas decreasing the pH increases the solubility of an anhydrous borax RIBM. In preferred embodiments of the present invention, the solubility of the RIBM is controlled such that complete dissolution of the RIBM at design temperature takes more than two hours, and in some cases longer than a week. In still other preferred embodiments, the solubility of the RIBM is controlled such that 50% dissolution of the RIBM at design temperature takes at least two hours. In still other preferred embodiments, the solubility of the RIBM is controlled such that 50% dissolution of the RIBM at design temperature takes at least twenty-four hours.

To allow for relatively slow solubility, the treatment fluids of the present invention are preferably pH neutral or below. In some embodiments, such as wherein the treatment fluid is also acting as an acidizing fluid, the pH may be very low.

Whether using the RIBM as a fluid loss control agent, a diverting agent, or a plugging agent, the RIBM is preferably included in the treatment fluid in an amount of about 50 pounds per thousand gallons ("pptg") and as high as about 20 pounds per gallon ("ppg"). In some preferred embodiments the RIBM compounds is included in the treatment fluid in an amount from about 50 pptg to about 400 pptg. This relatively high loading of RIBM into the treatment fluid allows for a sufficient quantity of RIBM to act to plug a space, control fluid loss, or divert fluids as desired. As one skilled in the art would recognize, the loadings given list in the above are for an unfoamed base fluid. Foamed base fluids are reduced carrying capacity based, at least in part, on the density of the foam.

In accordance with embodiments of the present invention, the treatment fluids generally comprise a base fluid and a RIBM that acts as a fluid loss control agent, a diverting agent, or a plugging agent as noted above. The treatment fluid may be aqueous, non-aqueous, foamed, or an emulsion. In embodiments, wherein the treatment fluids of the present invention may be a foamed fluid (e.g., a liquid that comprises a gas) any suitable gas may be used, including nitrogen, carbon dioxide, air, or methane). As used herein, the term "foamed" also refers to fluids such as commingled fluids. In some embodiments, a foamed treatment fluid may be desirable to, among other things, reduce the amount of fluid that is required in a water sensitive subterranean formation, to reduce fluid loss in the formation, and/or to provide enhanced proppant suspension. In examples of such embodiments, the gas may be present in the range of from about 5% to about 98% by volume of the treatment fluid, and more preferably in the range of from about 20% to about 80% by volume of the treatment fluid. The amount of gas to incorporate in the fluid may be affected by many factors including the viscosity of the fluid and the bottom hole pressures involved in a particular application. One of ordinary skill in the art, with the benefit of this disclosure, will recognize how much gas, if any, to incorporate into foamed treatment fluids of the present invention.

Depending on the use of the treatment fluid, in some embodiments, other additives may optionally be included in the treatment fluids of the present invention. Examples of such additives may include, but are not limited to, salts, pH control additives, surfactants, breakers, biocides, crosslinkers, additional fluid loss control agents, stabilizers, chelating agents, scale inhibitors, gases, mutual solvents, particulates, corrosion inhibitors, oxidizers, reducers, and any combination thereof. A person of ordinary skill in the art, with the benefit of this disclosure, will recognize when such optional additives should be included in a treatment fluid used in the present invention, as well as the appropriate amounts of those additives to include.

In some embodiments, particularly in fracturing and gravel packing operations, it may be desirable to add a viscosifying agent to the treatment fluids used in the present invention. Suitable viscosifying agents may comprise any substance (e.g., a polymeric material) capable of increasing the viscosity of the treatment fluids. In certain embodiments, the viscosifying agent may comprise one or more polymers that have at least two molecules that are capable of forming a crosslink in a crosslinking reaction in the presence of a crosslinking agent, and/or polymers that have at least two molecules that are crosslinked (i.e., a crosslinked viscosifying agent). The viscosifying agents may be biopolymers, polysaccharides, and/or derivatives thereof that contain one or more of these monosaccharide units: galactose, mannose, glucose, xylose, arabinose, fructose, glucuronic acid, or pyranosyl sulfate. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. Examples of suitable viscosifying agents include, but are not limited to, cellulose derivatives, carboxymethylguars, carboxymethylhydroxyethylguars, carboxymethylhydroxypropylguars, hydroxyethylcelluloses, carboxyethylcelluloses, carboxymethylcelluloses, carboxymethylhydroxyethylcelluloses, diutan gums, xanthan gums, galactomannans, hydroxyethylguars, hydroxypropylguars, scleroglucans, wellans, starches (also known as polysaccharide gums), and any derivative and combination thereof.

The viscosifying agent may be present in the treatment fluids useful in the methods of the present invention in an amount sufficient to provide the desired viscosity. In some embodiments, the viscosifying agents may be present in an amount in the range of from about 0.01% to about 10% by weight of the treatment fluid. In other embodiments, the viscosifying agents may be cellulose derivatives present in an amount in the range of from about 0.1% to about 1% by weight of the treatment fluid. In other embodiments, the viscosifying agents may be starches present in the range of from about 3% to 5% by weight of the treatment fluid. In other embodiments, the viscosifying agents may be polysaccharides present from about 0.1% to 3% by weight of the treatment fluid. In some embodiments the viscosifying agent may be a mixture of a polysaccharide and a starch (as used herein, the term "starch" refers to a polysaccharide gum).

In those embodiments of the present invention where it is desirable to crosslink the viscosifying agent, the treatment fluid may comprise one or more crosslinking agents. The crosslinking agents may comprise a metal ion or similar component that is capable of crosslinking at least two molecules of the viscosifying agent. Examples of suitable crosslinking agents include, but are not limited to, magnesium ions, zirconium ions, titanium ions, aluminum ions, antimony ions, chromium ions, iron ions, copper ions, magnesium ions, and zinc ions. These ions may be provided by providing any compound that is capable of producing one or more of these ions as is well understood by those of skill in the art. Examples of such compounds include, but are not limited to, ferric chloride, magnesium oxide, zirconium lactate, zirconium triethanolamine, zirconium lactate triethanolamine, zirconium carbonate, zirconium acetylacetonate, zirconium malate, zirconium citrate, zirconium diisopropylamine lactate, zirconium glycolate, zirconium acetate lactate, zirconium triethanolamine glycolate, zirconium lactate glycolate, zirconium triisopropanolamine lactate, titanium lactate, titanium malate, titanium citrate, titanium ammonium lactate, titanium triethanolamine, and titanium acetylacetonate, aluminum lactate, aluminum citrate, aluminum acetate, antimony compounds, chromium(III) compounds, iron(II) compounds, iron(III) compounds, copper compounds, zinc compounds, and combinations thereof. In certain embodiments of the present invention, the crosslinking agent may be formulated to remain inactive until it is "activated" by, among other things, certain conditions in the fluid (e.g., pH, temperature, etc.) and/or interaction with some other substance. In some preferred embodiments, a crosslinking agent may be used wherein the ion-containing compounds is selected from the group consisting of ammonium zirconium carbonate, zirconium citrate, zirconium lactate citrate, zirconium oxide, titanium dioxide, aluminum nicotinate, aluminum sulfate, aluminum sodium sulfate, aluminum ammonium sulfate, chromium caseinate, chromium potassium sulfate, zinc sulfate, zinc hydrosulfite, magnesium chloride, magnesium sulfate, magnesium gulconate, copper sulfate, and copper gulconate.

When included, suitable crosslinking agents may be present in the treatment fluids useful in the methods of the present invention in an amount sufficient to provide a desired degree of crosslinking between molecules of the viscosifying agent. In certain embodiments, the crosslinking agent may be present in the treatment fluids of the present invention in an amount in the range of from about 0.005% to about 1% by weight of the treatment fluid. In other embodiments, the crosslinking agent may be present in the treatment fluids of the present invention in an amount in the range of from about 0.05% to about 0.1% by weight of the first treatment fluid and/or second treatment fluid. While crosslinking agents may be added in a concentrated solution, the numerical ranges given above refer to the percentage of metal ions by weight of the treatment fluid. One of ordinary skill in the art, with the benefit of this disclosure, will recognize the appropriate amount of crosslinking agent to include in a treatment fluid of the present invention based on, among other things, the temperature conditions of a particular application, the type of viscosifying agents used, the molecular weight of the viscosifying agents, the desired degree of viscosification, and/or the pH of the treatment fluid.

It generally takes greater horsepower to pump fluids that are more viscous; thus, it may be desirable to delay the crosslink of the treatment fluids of the present invention until the fluid is close to the area to be treated. Such delay allows the operator to pump a non-crosslinked (and thus less viscous) fluid over a longer distance before having to add horsepower to place the more viscous, crosslinked fluid. One skilled in the art will be familiar with known methods to delay crosslinking, such as encapsulation, chemical delays (e.g. chelating agents), etc. In some embodiments, the activation of the crosslinking agent may be delayed by encapsulation with a coating (e.g., a porous coating through which the crosslinking agent may diffuse slowly or a degradable coating that degrades down hole) that delays the release of the crosslinking agent until a desired time or place.

The treatment fluids of the present invention may comprise particulates, such as proppant particulates or gravel particulates. Such particulates may be included in the treatment fluids of the present invention, for example, when a gravel pack is to be formed in at least a portion of the well bore, or a proppant pack is to be formed in one or more fractures in the subterranean formation. Particulates suitable for use in the present invention may comprise any material suitable for use in subterranean operations. Suitable materials for these particulates may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulate size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

Examples of suitable pH control additives that may optionally be included in the treatment fluids of the present invention are bases and/or acid compositions. A pH control additive may be necessary to maintain the pH of the treatment fluid at a desired level, e.g., to improve the effectiveness of certain breakers or crosslinkers, etc. In some instances, it may be beneficial to maintain the pH at 3.5-5. One of ordinary skill in the art with the benefit of this disclosure will be able to recognize a suitable pH for a particular application.

In one embodiment, the pH control additive may be an acid composition. Examples of suitable acid compositions may comprise an acid, an acid generating compound, and combinations thereof. Any known acid may be suitable for use with the treatment fluids of the present invention. Examples of acids that may be suitable for use in the present invention include, but are not limited to, organic acids (e.g., formic acids, acetic acids, carbonic acids, citric acids, glycolic acids, lactic acids, ethylenediaminetetraacetic acid (EDTA), hydroxyethyl ethylenediamine triacetic acid (HEDTA), and the like), inorganic acids (e.g., hydrochloric acid, hydrofluoric acid, phosphonic acid, p-toluenesulfonic acid, and the like), and combinations thereof. The pH control additive also may comprise a base to elevate the pH of the treatment fluid. Any known base that is compatible with the viscosifying agents of the present invention can be used in the treatment fluids of the present invention. Examples of suitable bases include, but are not limited to, sodium hydroxide, potassium carbonate, potassium hydroxide, sodium carbonate, and sodium bicarbonate. One of ordinary skill in the art with the benefit of this disclosure will recognize the suitable bases that may be used to achieve a desired pH elevation.

In some embodiments, the treatment fluids of the present invention may include surfactants, e.g., to improve the compatibility of the treatment fluids of the present invention with other fluids (like any formation fluids) that may be present in the well bore. One of ordinary skill in the art with the benefit of this disclosure will be able to identify the type of surfactant as well as the appropriate concentration of surfactant to be used. Suitable surfactants may be used in a liquid or powder form. Where used, the surfactants may be present in the treatment fluid in an amount sufficient to prevent incompatibility with formation fluids, other treatment fluids, or well bore fluids. In an embodiment where liquid surfactants are used, the surfactants are generally present in an amount in the range of from about 0.01% to about 5.0% by volume of the treatment fluid. In other embodiments, the liquid surfactants are present in an amount in the range of from about 0.1% to about 2.0% by volume of the treatment fluid. In embodiments where powdered surfactants are used, the surfactants may be present in an amount in the range of from about 0.001% to about 0.5% by weight of the treatment fluid.

In some embodiments, the surfactant may be a viscoelastic surfactant. These viscoelastic surfactants may be cationic, anionic, nonionic, amphoteric, or zwitterionic in nature. The viscoelastic surfactants may comprise any number of different compounds, including methyl ester sulfonates (e.g., as described in U.S. Patent Application Nos. 2006/0180310, 2006/0180309, 2006/0183646 and U.S. Pat. No. 7,159,659, the entire disclosures of which are incorporated herein by reference), hydrolyzed keratin (e.g., as described in U.S. Pat. No. 6,547,871, the entire disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. In certain embodiments, the surfactant may comprise a surfactant such as sodium lauryl sulfate, polyoxyethylene (20) sorbitan monolaurate (commonly known as Polysorbate 20 or Tween 20), polysorbate 60 polysorbate 65, polysorbate 80, or sorbitan monostearate.

In those embodiments where it is desirable to foam the treatment fluids of the present invention, surfactants such as HY-CLEAN (HC-2) surface-active suspending agent or AQF-2 additive, both commercially available from Halliburton Energy Services, Inc., of Duncan, Okla., may be used. Additional examples of foaming agents that may be used to foam and stabilize the treatment fluids of this invention include, but are not limited to, betaines, amine oxides, methyl ester sulfonates, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Other suitable foaming agents and foam stabilizing agents may be included as well, which will be known to those skilled in the art with the benefit of this disclosure.

In some embodiments of the present invention, the treatment fluids may comprise breakers. Examples of such suitable breakers for treatment fluids of the present invention include, but are not limited to, sodium chlorites, hypochlorites, perborate, persulfates, and peroxides (including organic peroxides). Other suitable breakers include, but are not limited to, suitable acids and peroxide breakers, delinkers, as well as enzymes that may be effective in breaking viscosified treatment fluids. In some preferred embodiments, the breaker may be citric acid, tetrasodium EDTA, ammonium persulfate, or cellulose enzymes. A breaker may be included in a treatment fluid of the present invention in an amount and form sufficient to achieve the desired viscosity reduction at a desired time. The breaker may be formulated to provide a delayed break, if desired. For example, a suitable breaker may be encapsulated if desired. Suitable encapsulation methods are known to those skilled in the art. One suitable encapsulation method involves coating the selected breaker in a porous material that allows for release of the breaker at a controlled rate. Another suitable encapsulation method that may be used involves coating the chosen breakers with a material that will degrade when downhole so as to release the breaker when desired. Resins that may be suitable include, but are not limited to, polymeric materials that will degrade when downhole.

A treatment fluid of the present invention may optionally comprise an activator or a retarder to, among other things, optimize the break rate provided by a breaker. Any known activator or retarder that is compatible with the particular breaker used is suitable for use in the present invention. Examples of such suitable activators include, but are not limited to, acid generating materials, chelated iron, copper, cobalt, and reducing sugars. Examples of suitable retarders include sodium thiosulfate, methanol, and diethylenetriamine. In some embodiments, the retarder may be used in a range of from about 1 to about 100 lb/Mgal of treatment fluid. Note, as used herein, "pounds per thousand gallons" may be expressed as "lb/Mgal" or "pptg." A preferred range may be from about 5 to about 20 lb/Mgal. An artisan of ordinary skill with the benefit of this disclosure will be able to identify a suitable activator or retarder and the proper concentration of such activator or retarder for a given application.

In certain embodiments of the present invention, the breakers may be encapsulated by synthetic and natural waxes. Waxes having different melting points may be used in order to control the delay of breaking based on the temperature of a specific subterranean operation. In an embodiment, the encapsulation of the breaker is performed by mixing the breaker and wax above the melting temperature for the specific wax and then extruding the composition to form small particles of the encapsulated material. The resulting product may be annealed by briefly heating the product to the point of the coating to seal cracks in the coating, thus preventing premature release. The encapsulation may also be achieved by melt spraying the wax on the breaker (e.g., citric acid) particles or by any other technique known by a person of ordinary skill in the art. If used, a breaker should be included in a treatment fluid of the present invention in an amount sufficient to facilitate the desired reduction in viscosity in a treatment fluid. For instance, peroxide concentrations that may be used vary from about 0.1 to about 30 gallons of peroxide per 1000 gallons of the treatment fluid. Similarly, for instance, when citric acid is used as a breaker, concentrations of from 0.11 b/Mgal to 30 lb/Mgal are appropriate.

In some embodiments of the present invention the treatment fluids may comprise additional fluid loss control additives known in the art in addition to the relatively insoluble borate material particulates described herein. Examples of such additional fluid loss control agents include, but are not limited to, starches (such as IN-DRIL® HT Plus, commercially available from Halliburton Energy Services, Inc. of Duncan, Okla.), silica flour, gas bubbles (energized fluid or foam), benzoic acid, soaps, resin particulates, relative permeability modifiers, and other immiscible fluids. It is also known in the art to use a dispersion of diesel in fluid as a fluid loss control agent; however, its use may have negative environmental impacts. If included, the additional fluid loss additive may be included in an amount of about 5 to about 2000 pptg of the treatment fluid. In some embodiments, the additional fluid loss additive may be included in an amount from about 10 to about 50 pptg of the treatment fluid. For some liquid additives that function as fluid loss additives, these may be included in an amount from about 0.01% to about 20% by volume; in some embodiments, these may be included in an amount from about 1.0% to about 10% by volume.

However, in other embodiments, it may be desirable to use the relatively insoluble borate material particulates of the present invention without using a substantial amount of another fluid loss control additive. That is, to have at least about 75% to about 100% of the fluid loss reduction be due to the use of the RIBM rather than to the use of an additional fluid loss control additive. In some embodiments, the treatment fluid is substantially free of fluid loss control material other than the relatively insoluble borate material particulates.

In certain embodiments, the present invention provides methods that include a method comprising: providing a fracturing fluid comprising a base fluid and a relatively insoluble borate material particulate; introducing the fracturing fluid into at least a portion of the subterranean formation at fracturing pressures and allowing the relatively insoluble borate material particulate to provide fluid loss control along the fracture faces. The relatively insoluble borate material particulate may then degrade over time in the subterranean formation.

In certain embodiments, the present invention provides methods that include a method comprising: providing a treatment fluid comprising a base fluid and a relatively insoluble borate material particulate; introducing the treatment fluid into at least a portion of the subterranean formation at matrix rates and allowing the relatively insoluble borate material particulates to provide fluid loss control along the more permeable zone of the treated portion of the formation. The relatively insoluble borate material particulate may then degrade over time in the subterranean formation.

In certain embodiments, the present invention provides methods that include a method comprising: providing a treatment fluid comprising a base fluid and a relatively insoluble borate material particulate; introducing the treatment fluid into at least a portion of an annulus along a well bore and allowing the relatively insoluble borate material particulate to plug a desired portion along the annulus. The relatively insoluble borate material particulate may then degrade over time in the subterranean formation.

To facilitate a better understanding of the present invention, the following examples of the preferred embodiments are given. In no way should the following examples be read to limit, or define, the scope of the invention.

EXAMPLE 1

A test apparatus was set up holding an Ohio sandstone core. The sandstone core had been prepared to measure 6 inches in length and approximately 1.5 inches in diameter. The core had also been split longitudinally and then cemented back together leaving a 0.5-inch gap to represent a subterranean fracture of a porous medium.

The entire test proceeded at room temperature. The core was placed into a core holder (a 1⅝ inch Hassler sleeve) with an entrance valve at the top and an exit valve at the bottom. Above the entrance valve was placed a slurry mixing cell with a motorized stirring adaptor attached. The core holder and lines were filled with 0.5 gptg (gallons per thousand gallons) of FR-66 friction reducer and Duncan Okla. tap water. "FR-66" refers to a friction reducer commercially available from Halliburton Energy Services of Duncan, Okla. Next, 200 milliliters of water mixed with 0.5 gptg FR-66 friction reducer was mixed with 30 grams of relatively insoluble borate material particulate and that mixture was placed into the slurry mixing cell with the motorized stirring adaptor activated. Next, about 500-psi nitrogen pressure was applied to the slurry mixing cell and about 800-psi nitrogen pressure was applied to the core holder. This gives a 300 psi overburden pressure to seal the outer area of the core and force all flow through the desire gap width.

When the pressure stabilized, the valve on top of the core holder, between the slurry mixing cell and the core, was opened and then the valve at the bottom of the core holder was opened and the material leaving the exit valve was monitored for indication of relatively insoluble borate material exiting the cell. Very little flow was noted at the exit and when the cell was removed, the relatively insoluble borate material particulate had collected at the top of the core face and entered the 0.5-inch gap so as to plug flow to a minimum. Thus, the relatively insoluble borate material particulate acted as a strong diverting agent in the test. Cleaning the particles from the top of the core revealed some particles which had bridged off the 0.5-inch gap at the opening, penetrating only slightly.

EXAMPLE 2

The following example demonstrates the degradation characteristics of a relatively insoluble borate material. The tests simulate a perforation tunnel packed with a bed of anhydrous sodium borate and a volume of fluid in contact with the packed bed to simulate the aqueous fluid that might occupy the well bore adjacent to the perforation. The test perforation had a diameter of ⅜" and a length of 1.5", the volume of aqueous fluid in contact with the packed perforation was 350 mL, a pressure of 150 psi was held throughout the test, and the test was begun at neutral pH. The level was determined by cooling the cell down to below boiling, opening the cell and measuring the height of the particle bed. This was done in one of two ways: by having multiple cells and opening them at different time intervals or on longer tests, opening a cell and then closing back to continue the test at the desired temperature and pressure. The table below gives the results of tests performed at 200° F., 300° F. and 400° F. and the numbers shown represent the percent of the perforation tunnel pack height that had degraded.

TABLE 1

Degradation of RIBM at various temperatures

| Time (hrs) | 200° F. | 300° F. | 400° F. |
|---|---|---|---|
| 0 | 0% | 0% | 0% |
| 2 | 8% | 17% | 30% |
| 24 | 22% | 43% | 54% |
| 48 | 32% | 60% | 72% |
| 72 | 41% | 76% | 95% |
| 96 | 48% | 91% | |
| 120 | 57% | | |
| 144 | 65% | | |
| 168 | 75% | | |
| 192 | 87% | | |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the specified range is also suitable for use in the present invention and is hereby specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of providing fluid diversion, providing fluid loss control, or plugging in a portion of a subterranean formation comprising:
    providing a treatment fluid comprising a base fluid and sodium tetraborate monohydrate particulates wherein the pH of the treatment fluid is neutral or lower;
    introducing the treatment fluid into a portion of a subterranean formation penetrated by a well bore;
    allowing the sodium tetraborate monohydrate particulates to provide fluid loss or plug an area along the annulus of a well bore; and,
    allowing the sodium tetraborate monohydrate particulates to degrade over time in the subterranean formation.

2. The method of claim 1 wherein the sodium tetraborate monohydrate particulates are present in the treatment fluid in an amount of more than about 50 pptg.

3. The method of claim 1 wherein at least about 50% of the sodium tetraborate monohydrate particulates remain after about 2 hours at design temperature.

4. The method of claim 1 wherein the treatment fluid is used to provide fluid loss control wherein the treatment fluid is placed into a portion of the subterranean formation at a pressure sufficient to create or extend at least one fracture therein and the sodium tetraborate monohydrate particulates plug the pore spaces, the interstitial spaces, or both to provide fluid loss control in the portion of the subterranean formation.

5. The method of claim 1 wherein the treatment fluid is used to provide fluid diversion; and,
    wherein the treatment fluid is introduced into a portion of the subterranean formation at matrix rates;
    wherein the subterranean formation comprises a first zone and a second zone and wherein the first zone is more permeable to the treatment fluid than the second zone; and
    allowing the sodium tetraborate monohydrate particulates to seal the rock surfaces along the first zone and thereby divert the treatment fluid to the second zone.

6. The method of claim 1 wherein the treatment fluid is used to plug a portion of a well bore annulus; and,
    wherein the treatment fluid is placed into a zone along the well bore annulus such that the sodium tetraborate monohydrate particulates substantially fill the annulus along the zone to be plugged.

7. A method of providing fluid diversion, fluid loss control, or plugging in a portion of a subterranean formation comprising:
    providing a treatment fluid comprising a base fluid sodium tetraborate monohydrate particulates wherein the sodium tetraborate monohydrate particulates are present in the treatment fluid in an amount of more than about 50 pptg;
    introducing the treatment fluid into a portion of a subterranean formation penetrated by a well bore;
    allowing the sodium tetraborate monohydrate particulates to provide fluid loss or plug an area along the annulus of a well bore; and,
    allowing the relatively insoluble borate material particulates to degrade over time in the subterranean formation.

8. The method of claim 7 wherein the pH of the treatment fluid is neutral or lower.

9. The method of claim 7 wherein at least about 50% of the sodium tetraborate monohydrate particulates remain after about 2 hours at design temperature.

10. The method of claim 7 wherein the treatment fluid is used to provide fluid loss control wherein the treatment fluid is placed into a portion of the subterranean formation at a pressure sufficient to create or extend at least one fracture therein and the sodium tetraborate monohydrate particulates plug the pore spaces, the interstitial spaces, or both to provide fluid loss control in the portion of the subterranean formation.

11. The method of claim 7 wherein the treatment fluid is used to plug a portion of a well bore annulus; and,
    wherein the treatment fluid is placed into a zone along the well bore annulus such that the sodium tetraborate monohydrate particulates substantially fill the annulus along the zone to be plugged.

12. A method of providing fluid diversion, fluid loss control, or plugging in a portion of a subterranean formation comprising:
    providing a treatment fluid comprising a base fluid and sodium tetraborate monohydrate particulates;
    introducing the treatment fluid into a portion of a subterranean formation penetrated by a well bore;
    allowing the sodium tetraborate monohydrate particulates to provide fluid loss or plug an area along the annulus of a well bore; and,
    allowing the sodium tetraborate monohydrate particulates to degrade over time in the subterranean formation wherein at least about 50% of the relatively insoluble borate material particulates remain after about 2 hours at design temperature.

13. The method of claim 12 wherein the pH of the treatment fluid is neutral or lower.

14. The method of claim 12 wherein the sodium tetraborate monohydrate particulates are present in the treatment fluid in an amount of more than about 50 pptg.

15. The method of claim 12 wherein the treatment fluid is used to provide fluid loss control wherein the treatment fluid is placed into a portion of the subterranean formation at a pressure sufficient to create or extend at least one fracture therein and the sodium tetraborate monohydrate particulates plug the pore spaces, the interstitial spaces, or both to provide fluid loss control in the portion of the subterranean formation.

16. The method of claim 12 wherein the treatment fluid is used to plug a portion of a well bore annulus; and,
    wherein the treatment fluid is placed into a zone along the well bore annulus such that the sodium tetraborate monohydrate particulates substantially fill the annulus along the zone to be plugged.

* * * * *